United States Patent [19]

Drakeley

[11] E Re. 31,591

[45] Reissued May 29, 1984

[54] FUSELAGE TAIL JET ENGINE THRUST REVERSER AND METHOD

[75] Inventor: George T. Drakeley, Bellevue, Wash.

[73] Assignee: The Boeing Company, Seattle, Wash.

[21] Appl. No.: 325,706

[22] Filed: Nov. 30, 1981

Related U.S. Patent Documents

Reissue of:

[64] Patent No.: 3,997,134
Issued: Dec. 14, 1976
Appl. No.: 562,587
Filed: Mar. 27, 1975

U.S. Applications:

[63] Continuation of Ser. No. 133,339, Mar. 24, 1980, abandoned, which is a continuation of Ser. No. 967,212, Dec. 7, 1978, abandoned.

[51] Int. Cl.[3] ..... B64D 33/04

[52] U.S. Cl. ..... 244/110 B; 244/12.5; 244/23 D; 244/100 R; 244/50; 181/222; 239/265.29

[58] Field of Search ..... 244/12.5, 23 D, 50, 244/54, 55, 110 B, 100 R, 102 R; 440/40, 41, 42, 43; 239/265.13, 265.19, 265.25, 265.27, 265.29; 60/226.2, 229, 230; 181/222, 215

[56] References Cited

U.S. PATENT DOCUMENTS

| | | | |
|---|---|---|---|
| 2,687,857 | 8/1954 | Caldwell et al. | 244/50 |
| 2,802,333 | 8/1957 | Price et al. | 60/35.54 |
| 2,853,852 | 9/1958 | Bodine | 181/222 |
| 2,857,119 | 10/1958 | Morguloff | 244/52 |
| 2,944,394 | 7/1960 | Peregrine | 244/110 B |
| 2,973,921 | 3/1961 | Price | 244/125 |
| 2,988,302 | 6/1961 | Smith | 181/222 |
| 3,155,342 | 11/1964 | Bölkow et al. | 244/12 |
| 3,285,537 | 11/1966 | Whittley | 244/12 |
| 3,614,037 | 10/1971 | Vdolek | 244/110 B |
| 3,655,133 | 4/1972 | Medawar et al. | 244/110 B |
| 3,688,989 | 9/1972 | McMurtry | 239/265.29 |
| 3,710,890 | 1/1973 | True et al. | 181/33 HC |
| 3,736,750 | 6/1973 | Britt | 60/226 A |
| 3,739,582 | 6/1973 | Maison | 60/226 A |
| 3,753,540 | 8/1973 | Renner | 244/50 |
| 3,791,586 | 2/1974 | Moorehead | 244/110 B |
| 3,844,375 | 10/1974 | Manca et al. | 181/33 HC |
| 3,863,867 | 2/1975 | Souslin et al. | 244/110 B |
| 3,936,017 | 2/1976 | Blythe et al. | 224/110 B |

FOREIGN PATENT DOCUMENTS

| | | | |
|---|---|---|---|
| 1227782 | 10/1966 | Fed. Rep. of Germany | 239/265.29 |
| 1278069 | 6/1972 | United Kingdom | 244/110 B |

*Primary Examiner*—Galen L. Barefoot
*Attorney, Agent, or Firm*—Ward Brown; Robert W. Beach

[57] ABSTRACT

Production of a downwardly and forwardly directed reverse thrust discharged from a reverse-thrust duct is controlled *during landing* by a door in the rearward-discharge duct having its rearward portion pivotally mounted for swinging of its forward portion between a position lodged in a recess in the side of the rearward-discharge duct and a position in which the forward edge of the door is spaced from the recess and the door is inclined to deflect jet exhaust from the rearward-discharge duct into the reverse-thrust duct branching from the rearward-discharge duct. The discharge end of the reverse-thrust duct can be closed by a second door and actuating [means] *mechanism* interconnecting the two doors can move them simultaneously through proportionate degrees of movement.

5 Claims, 2 Drawing Figures

FUSELAGE TAIL JET ENGINE THRUST REVERSER AND METHOD

Matter enclosed in heavy brackets [ ] appears in the original patent but forms no part of this reissue specification; matter printed in italics indicates the additions made by reissue.

*This is a continuation of reissue application Serial No. 133,339, filed Mar. 24, 1980, now abandoned, which was a continuation of reissue application Ser. No. 967,212, filed Dec. 7, 1978, now abandoned, for reissue of U.S. Patent No. 3,997,134.*

BACKGROUND OF THE INVENTION

1. Field of the Invention

The present invention relates to thrust-reverser installations for airplane jet engines, and, in particular, to a downwardly and forwardly directed thrust-reversing jet, [and] to control mechanism for such a jet *and to a method of using the thrust-reversing jet during landing of an airplane.*

2. Prior Art

Various types of thrust-reversers for jet engines have been provided, but such reverse-thrust jets in the past have been directed to the side of the engine or the fuselage ordinarily, or, if the thrust-reversing jet has been directed downward, it has not been conveniently adapted to a jet engine buried in the tail of a fuselage.

SUMMARY OF THE INVENTION

It is an object of the present invention to provide a jet engine installation buried in the tail of an airplane fuselage having a sole downwardly and forwardly directed reverse-thrust duct into which a jet exhaust can be deflected easily and quickly.

A further object is to be able to close both ends of such a reverse-thrust duct when the jet engine is producing forward thrust and which will enable the reverse-thrust duct to be opened in a controlled manner when it is desired to produce a reverse-thrust *such as during landing.*

*An additional object is to provide mechanism and a method for landing a conventional airplane having a steerable nose wheel to assure prompt and firm contact of the nose wheel against the ground.*

The foregoing objects can be accomplished by providing a control door in a rearward-discharge duct from a jet engine and a control door for the outer end of a reverse-thrust duct branching from the rearward-discharge duct *at the aft of the airplane* and which reverse-thrust duct is directed only forward and downward *so that, during landing, the exhaust jet from the engine can be directed downward and forward to produce a force tending to swing the nose of the airplane downward.*

DETAILED DESCRIPTION

Figure 1:
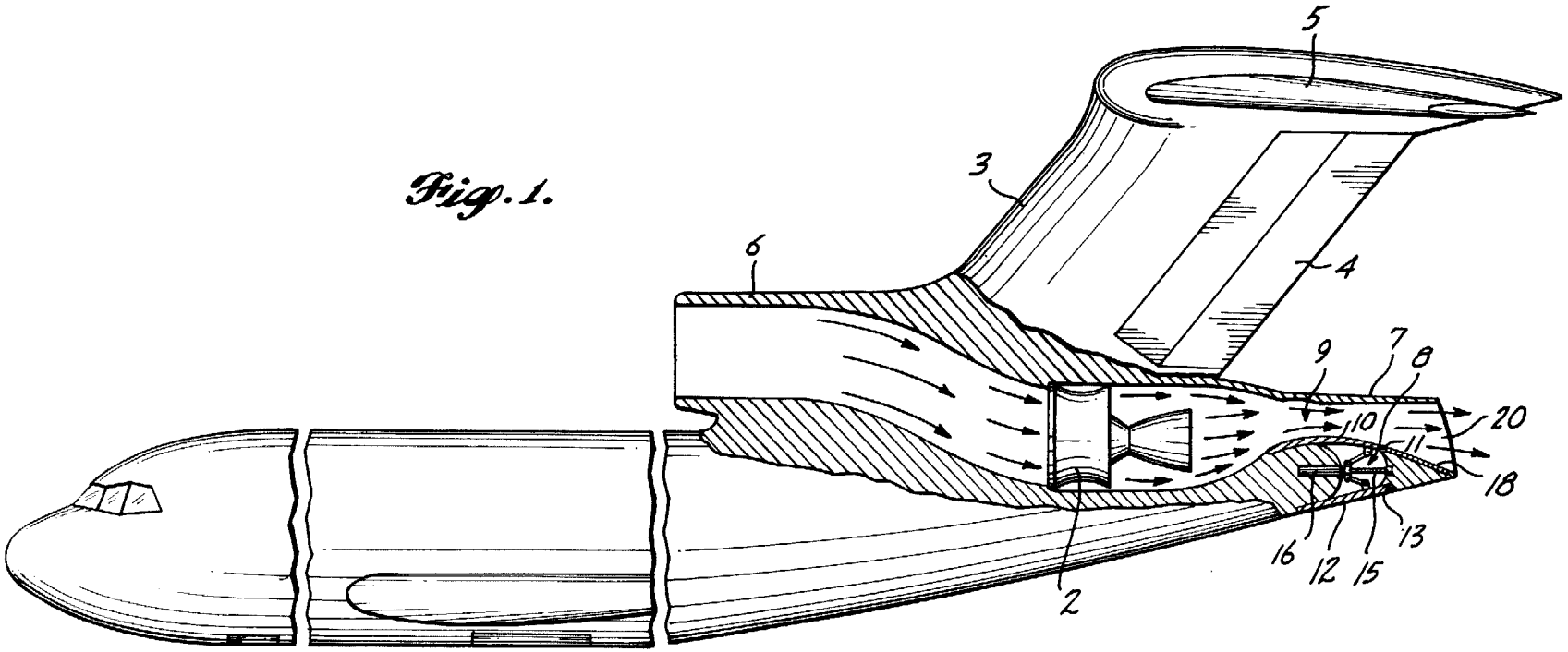
FIG. 1 is a side elevation [of the aft portion] of an airplane fuselage with parts broken away.

Installation of a jet engine buried in the tail of an airplane fuselage may be utilized in a trijet airplane in particular, but also can be used in [any type] *other types* of airplane jet arrangement. It will be understood, therefore, that the particular buried jet engine arrangement shown in the drawings is representative and largely diagrammatic. In the tail portion 1 of the fuselage, the jet engine 2 is installed in a duct extending longitudinally of the fuselage beneath the vertical fin 3. Such vertical fin is conventional having a rudder installation 4 carried by its trailing edge and a horizontal stabilizer 5 mounted on the upper end of the vertical fin.

The longitudinal duct through the tail portion of the fuselage 1, in which the jet engine 2 is mounted, includes a forward air supply duct portion 6 and an aft rearward-discharge duct portion 7. A reverse-thrust duct 8 branches from the throat 9 of the rearward-discharge duct 7, and the lower portion of such reverse-thrust duct 8 is directed forwardly and downwardly at an angle within the range of 15° to 45°. The forward component of an exhaust jet discharged from the reverse-thrust duct 8 will apply a retarding force to the airplane fuselage 1, whereas the vertical component of such exhaust jet will produce an upward thrust on the tail portion of the fuselage.

When the airplane touches down in making a landing, it is usually flying at a high angle of attack so that the nose of the fuselage is elevated. If the airplane undercarriage includes a steerable nose wheel *N*, such nose wheel may not initially come into contact with the ground, yet such ground contact is very desirable in order to enable turning of the nose wheel to effect steering of the airplane. [The] *In accordance with the present invention,* upward thrust *is* produced on the tail of the airplane *during landing* by the vertical component of the jet exhaust discharged from the reverse-thrust duct [will tend] *which tends* to raise the tail and, correspondingly, to depress the nose of the fuselage about a fulcrum located in the vicinity of the main landing gear*m*. Such upward thrust on the tail of the airplane [will, therefore, effect] *effects* engagement of the nose wheel with the landing strip or [increase] *increases* pressure of the nose wheel against the landing strip, so as to increase the steering effectiveness of the nose wheel.

The deflection of jet exhaust from the rearward-discharge duct 7 into the *intake of* reverse-thrust duct 8 can be controlled by constricting means including a control door 10 to select the amount of reverse thrust exerted on the airplane. Preferably, such control door is of the hinged type having its rearward portion mounted on a pivot 11, the axis of which extends transversely of the airplane. The control door swings about such pivot between the position shown in FIG. 1, in which the door lies alongside the lower wall of the rearward-discharge duct and such duct is fully opened, and the upwardly and forwardly inclined position shown in FIG. 2 in which the control door 10 extends completely across the rearward-discharge duct to block it.

During cruising, the entire portion of the jet exhaust is directed by door 10 through rearward-discharge duct 7. When the airplane speed is to be reduced, the door 10 can be moved to the selected location between its extreme positions of FIGS. 1 and 2 to provide the desired amount of reverse-thrust by directing a portion of the jet exhaust through each of ducts 7 and 8. Upon landing, door 10 will normally be swung to the position of FIG. 2 to direct the entire portion of jet exhaust through reverse-thrust duct 8.

Figure 2:
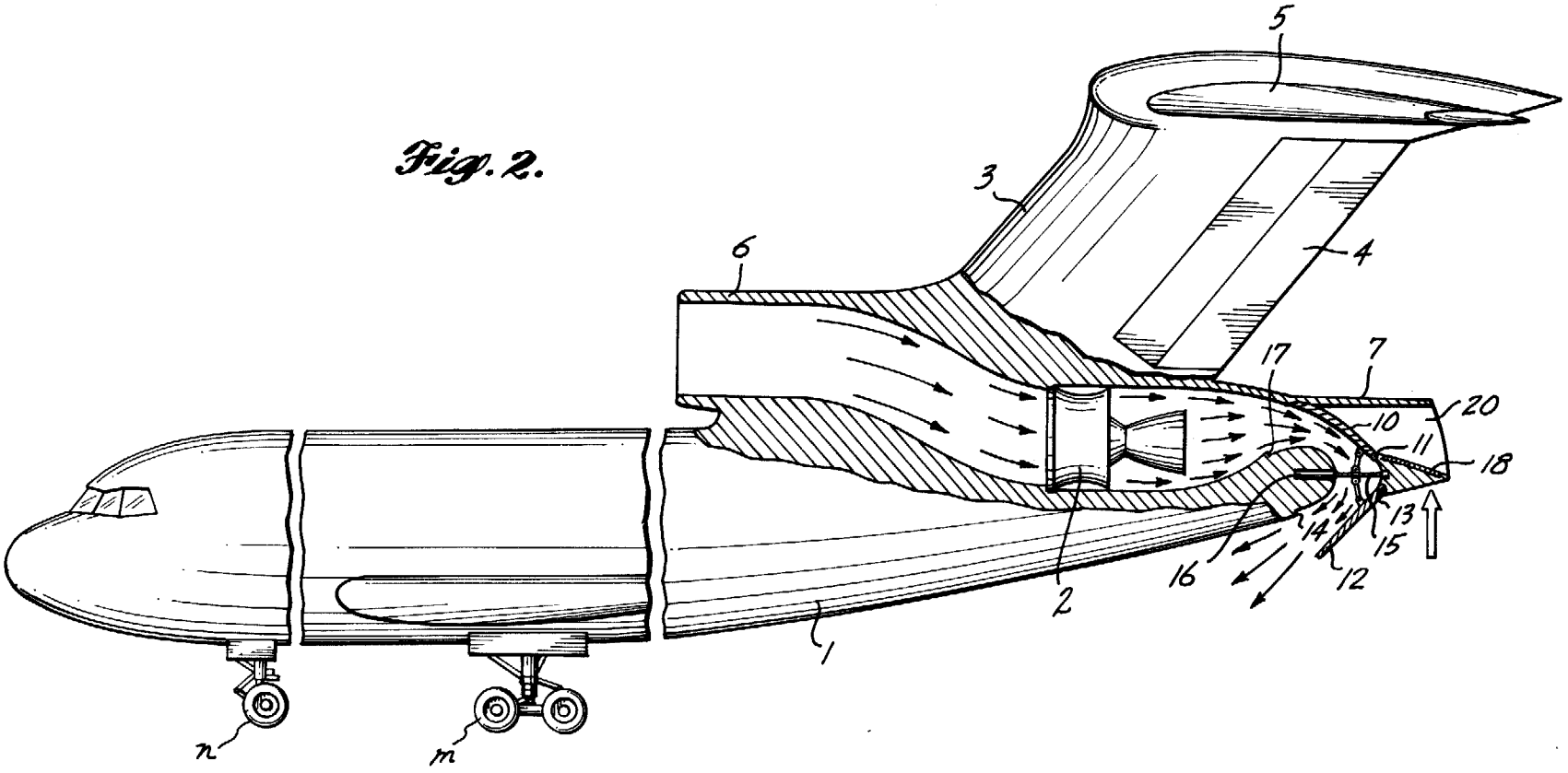
FIG. 2 is a similar view showing parts in different positions.

The pivot 11 is located at the rearward side of the junction between the rearward-discharge duct 7 and the reverse-thrust duct 8 so that the control door 10 in the position of FIG. 2 deflects the jet exhaust downward into the reverse-thrust duct. The *intake* end of such reverse-thrust duct opening into the rearward-discharge duct is fully open when the control door is in the position shown in FIG. 2. A vent door 12 may also be provided to close the lower *outlet* or exterior end of the reverse-thrust duct. Such vent door preferably is also of the hinged type being mounted on pivot 13 supporting the rearward portion of the vent door on the aft wall of the reverse-thrust duct 8. In closed position, the leading edge of the vent door is received behind a shoulder 14 forming a step in the forward wall of the reverse-thrust duct, as shown in FIG. 1. From such closed position, the vent door leading portion can swing downward so that the door extends forwardly and downwardly from the aft portion of the reverse-thrust duct *as shown in FIG. 2.*

It is preferred that the control door 10 and the vent door 12 be interconnected for simultaneous conjoint and proportionate movement. Swinging of the doors can be effected by rotation of a screw 15 effecting forward and aft movement of a toggle joint connecting the doors. Such screw can be rotated by an electric motor 16. Alternatively, the toggle joint can be actuated by a hydraulic jack.

When the control door 10 is in its position of FIG. 1 in which the rearward-discharge duct is fully opened, it is preferred that the forward edge of the door be received behind a shoulder 17 in the rearward-discharge duct so that the flow of jet exhaust gas from the power plant 2 will be as smooth as possible. Also, as illustrated in FIG. 1, it is preferred that the door 10 be curved so as to provide a throat in the rearward-discharge duct when such door is closing the reverse-thrust duct and to provide a scooping action to deflect the jet exhaust gas from the rearward-discharge duct into the reverse-thrust duct when the door is blocking the rearward-discharge duct, as shown in FIG. 2.

While provision of the vent door 12 is not essential, such door is desirable both to reduce drag by closing the opening of the reverse-thrust duct through the exterior of the fuselage 1 when all of the jet exhaust gases are flowing through the rearward-discharge duct 7 and to provide better control over the direction in which the jet exhaust gas is discharged from the reverse-thrust duct 8 when the control door 10 is in the position shown in FIG. 2.

While roller means could be used for swinging the doors 10 and 12 from the positions shown in FIG. 2 to the positions in FIG. 1, such doors could simply be spring-pressed toward the positions of FIG. 1. They could then be opened by release devices that would project their leading edges out from behind the shoulders 14 and 17, respectively, so that a blast of jet exhaust gas would swing the doors fully into their positions of FIG. 2 and hold them in such positions as long as the quantity of jet exhaust gas was sufficient to exceed the force exerted by the spring means. If the jet engine 2 were throttled down to reduce the discharge of jet exhaust gas sufficiently, the springs could return the doors to the positions of FIG. 1 and hold them in such positions until the forward edges of the doors were again pushed out from behind their shielding shoulders.

For the purpose of reducing the noise of the jet exhaust when the gas is being discharged through the rearward-discharge duct 7, such as during takeoff of the airplane, the portion of such exhaust duct rearwardly of control door 10 can be lined with suitable sound-absorbing material, such as perforated sandwich material. A horizontal sound deflector panel 18 of such material can line the bottom of the rearward discharge duct 7, and vertical sound shield panels 20 of such material can line opposite upright sides of such duct. The upper inner surface of such duct and the upper surface of control door 10 can also be covered with such material if desired. Moreover, the downward slope of the panel 18 will induce sound waves emitted from the rearward discharge duct 7 to be deflected downwardly which will further reduce the exhaust noise.

I claim:

[1. In an airplane fuselage power plant installation including a jet engine buried in the aft portion of the airplane fuselage and having a rearward-discharge duct opening in the tail of the fuselage, the improvement comprising reverse-thrust duct means branching from the rearward-discharge duct and constituting the sole reverse-thrust duct means, said reverse-thrust duct means opening through the bottom of the fuselage and being directed only downwardly and forwardly for discharge of jet exhaust producing thrust having a rearward component and an upward component, and control means for selectively proportioning jet exhaust discharge between the rearward-discharge duct and said sole reverse-thrust duct means .]

[2. In the airplane fuselage power plant installation defined in claim 1, and acoustical lining means lining the bottom and opposite upright sides of the rearward-discharge duct.]

[3. In the airplane power plant installation defined in claim 1, a vent door, and fixed pivot means at the rearward side of the discharge end of the reverse-thrust duct means supporting the rear portion of said vent door for swinging of said vent door between a position closing the reverse-thrust duct means and a position projecting substantially entirely outwardly beyond the surface of the airplane and inclined forwardly and downwardly from the rearward side of the discharge end of the reverse-thrust duct means.]

[4. In the airplane power plant installation defined in claim 1, the control means forming constricting means in the rearward-discharge duct when the control means is in position closing the reverse-thrust means.]

*5. In an airplane designed for conventional landing at substantial forward speed and having a steerable nose wheel and main landing gear located rearward of the nose wheel, a power plant installation comprising a jet engine mounted in thrust relationship to the aft portion of the airplane and having rearward-discharge duct means for normally directing the exhaust of the jet engine rearward, one and only one reverse-thrust duct means constituting the sole reverse-thrust duct means of such jet engine and having an exhaust intake that opens in the rearward-discharge duct means and an exhaust outlet that opens downward at the aft portion of the airplane, said reverse-thrust duct means being directed only forward and downward from said rearward-discharge duct means for discharge of jet exhaust at the aft portion of the airplane, and control door means selectively movable during landing of the airplane from a normal position closing said exhaust intake of said reverse-thrust duct means for discharge of jet exhaust rearward through the rearward-discharge duct means to a reverse-thrust position opening said exhaust intake and obstructing the rearward-discharge duct means for discharge of at least the major portion of the jet exhaust downward and forward through said reverse-thrust duct means to produce thrust on the aft portion of the airplane having a rearward component tending to retard forward move-*

*ment of the airplane during the landing ground run and an upward component tending to pitch the nose portion of the airplane downward about a fulcrum located in the vicinity of the main landing gear for increasing the pressure of the nose wheel on the ground and consequently increasing the steering effectiveness of the nose wheel during landing.*

*6. In the airplane defined in claim 5, the airplane including a fuselage, and the jet engine being buried in the aft portion of said fuselage.*

*7. In the airplane defined in claim 6, vent door means selectively movable between a normal position closing the exhaust outlet of the reverse-thrust duct means and a reverse-thrust position opening such outlet.*

*8. In an airplane designed for conventional landing at substantial forward speed and having a fuselage, a steerable nose wheel and main landing gear located rearward of the nose wheel, a power plant installation comprising a jet engine buried in the aft portion of the airplane fuselage and having a rearward-discharge duct for normally directing the exhaust of said jet engine rearward, one and only one reverse-thrust duct means constituting the sole reverse-thrust duct means of said jet engine and having an exhaust intake that opens in said rearward-discharge duct and an exhaust outlet that opens downward through the bottom of the airplane fuselage, said reverse-thrust duct means being directed only forward and downward from said rearward-discharge duct means for discharge of jet exhaust at the aft portion of the airplane fuselage, control door means selectively movable during landing of the airplane from a normal position closing said exhaust intake of said reverse-thrust duct means for discharge of jet exhaust rearward through said rearward-discharge duct means to a reverse-thrust position opening said exhaust intake and obstructing said rearward-discharge duct means for discharge of jet exhaust downward and forward through said reverse-thrust duct means to produce thrust on the aft portion of the airplane having a rearward component tending to retard forward movement of the airplane during the landing ground run and an upward component tending to pitch the nose portion of the airplane downward about a fulcrum located in the vicinity of the main landing gear for increasing the pressure of the nose wheel on the ground and consequently increasing the steering effectiveness of the nose wheel during the landing ground run, vent door means selectively movable between a normal position closing said exhaust outlet of said reverse-thrust duct means and a reverse-thrust position opening such outlet, and fixed pivot means at the rearward side of said exhaust outlet of said reverse-thrust duct means supporting the rear portion of said vent door means for swinging of said vent door means between its normal position and its reverse-thrust position, said vent door means in its reverse-thrust position projecting substantially entirely outward beyond the surface of the airplane fuselage and inclined forward and downward from the rearward side of said reverse-thrust duct means exhaust outlet.*

*9. The method of landing an airplane having a steerable nose wheel, main landing gear located rearward of the nose wheel and a jet engine mounted in thrust relationship to the aft portion of the airplane for normally propelling the airplane forward, which comprises effecting conventional approach of the airplane toward the ground at substantial forward speed, effecting touchdown of the airplane by engagement of the main landing gear with the ground, and, during the landing ground run of the airplane after touchdown, diverting at least the major portion of the exhaust of the jet engine from its normal generally rearward direction to only a downward and forward direction for producing thrust on the aft portion of the airplane having a rearward component for retarding forward movement of the airplane and an upward component tending to depress the nose portion of the airplane about a fulcrum located in the vicinity of the main landing gear for increasing the pressure of the nose wheel on the ground and consequently increasing the steering effectiveness of the nose wheel.*

* * * * *